US009140206B2

(12) United States Patent
Mc Donald

(10) Patent No.: US 9,140,206 B2
(45) Date of Patent: Sep. 22, 2015

(54) TORQUE CONTROL SYSTEMS AND METHODS

(76) Inventor: Mike M. Mc Donald, Macomb, MI (US)

( * ) Notice: Subject to any disclaimer, the term of this patent is extended or adjusted under 35 U.S.C. 154(b) by 1149 days.

(21) Appl. No.: 13/149,221

(22) Filed: May 31, 2011

(65) Prior Publication Data

US 2012/0310506 A1 Dec. 6, 2012

(51) Int. Cl.

*F02D 41/00* (2006.01)
*F02D 41/40* (2006.01)
*F02D 41/14* (2006.01)

(52) U.S. Cl.

CPC ............ *F02D 41/40* (2013.01); *F02D 41/0002* (2013.01); *F02D 2041/1412* (2013.01); *F02D 2200/0402* (2013.01); *F02D 2200/0406* (2013.01); *F02D 2200/0414* (2013.01); *F02D 2250/24* (2013.01); *Y02T 10/42* (2013.01); *Y02T 10/44* (2013.01)

(58) Field of Classification Search

CPC ............... H02P 9/04; H02P 9/00; H02P 9/48; H02P 2009/002; F02D 29/06; F02D 35/027; F02D 41/402; F02D 41/0025; F02D 41/30; Y02T 10/46; Y02T 10/44; Y02T 10/36; B60W 10/06

USPC ................. 123/299, 300, 304, 305, 399, 436; 290/488, 40 R, 40 A; 73/114.58, 73/114.61; 701/101-105, 110, 111, 115

See application file for complete search history.

(56) References Cited

U.S. PATENT DOCUMENTS

| | | | | |
|---|---|---|---|---|
| 4,658,787 | A * | 4/1987 | Takizawa | 123/406.19 |
| 6,612,291 | B2 * | 9/2003 | Sakamoto | 123/492 |
| 7,019,414 | B2 | 3/2006 | Albertson et al. | |
| 7,520,263 | B1 * | 4/2009 | Kim | 123/350 |
| 7,523,734 | B2 | 4/2009 | Albertson et al. | |
| 7,552,709 | B2 * | 6/2009 | Fujii | 123/299 |
| 7,946,275 | B2 | 5/2011 | McDonald | |
| 8,364,380 | B2 * | 1/2013 | Rayl et al. | 701/103 |
| 2008/0183369 | A1 * | 7/2008 | Kitagawa | 701/103 |
| 2009/0114187 | A1 * | 5/2009 | Kim | 123/350 |
| 2011/0320107 | A1 * | 12/2011 | Katsurahara et al. | 701/104 |

FOREIGN PATENT DOCUMENTS

JP 62113835 A * 5/1987 ............. F02D 41/10

* cited by examiner

*Primary Examiner* — Hai Huynh
*Assistant Examiner* — Raza Najmuddin

(57) ABSTRACT

A system of a vehicle includes a fueling prediction module, a short pulse determination module, a torque control module, and a generator control module. The fueling prediction module generates N predicted fueling pulse widths for N future combustion events of an engine, respectively. N is an integer greater than one. The short pulse determination module determines a number of the N predicted fueling pulse widths that are less than a predetermined period. The torque control module selectively increases a torque output of the engine based on the number. The generator control module selectively increases a load imposed by a generator of electricity based on the number.

20 Claims, 3 Drawing Sheets

100
160 Other Sensors
110 Engine Control Module
168 Load Control Module
164 Generator
172 Battery
Crankshaft Position
IAT
MAP
Rail Pressure
112 Throttle Actuator Module
120 Fuel Actuator Module
122 Spark Actuator Module
158
102
154
106
Air
108
124 118 128 132
121 114 126 130 134
150
142
Exhaust
127

TORQUE CONTROL SYSTEMS AND METHODS

FIELD

The present application relates to internal combustion engines and more particularly to torque control systems and methods for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs.

SUMMARY

A system of a vehicle includes a fueling prediction module, a short pulse determination module, a torque control module, and a generator control module. The fueling prediction module generates N predicted fueling pulse widths for N future combustion events of an engine, respectively. N is an integer greater than one. The short pulse determination module determines a number of the N predicted fueling pulse widths that are less than a predetermined period. The torque control module selectively increases a torque output of the engine based on the number. The generator control module selectively increases a load imposed by a generator of electricity based on the number.

A method for a vehicle includes: generating N predicted fueling pulse widths for N future combustion events of an engine, respectively, wherein N is an integer greater than one; determining a number of the N predicted fueling pulse widths that are less than a predetermined period; selectively increasing a torque output of the engine based on the number; and selectively increasing a load imposed by a generator of electricity based on the number.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
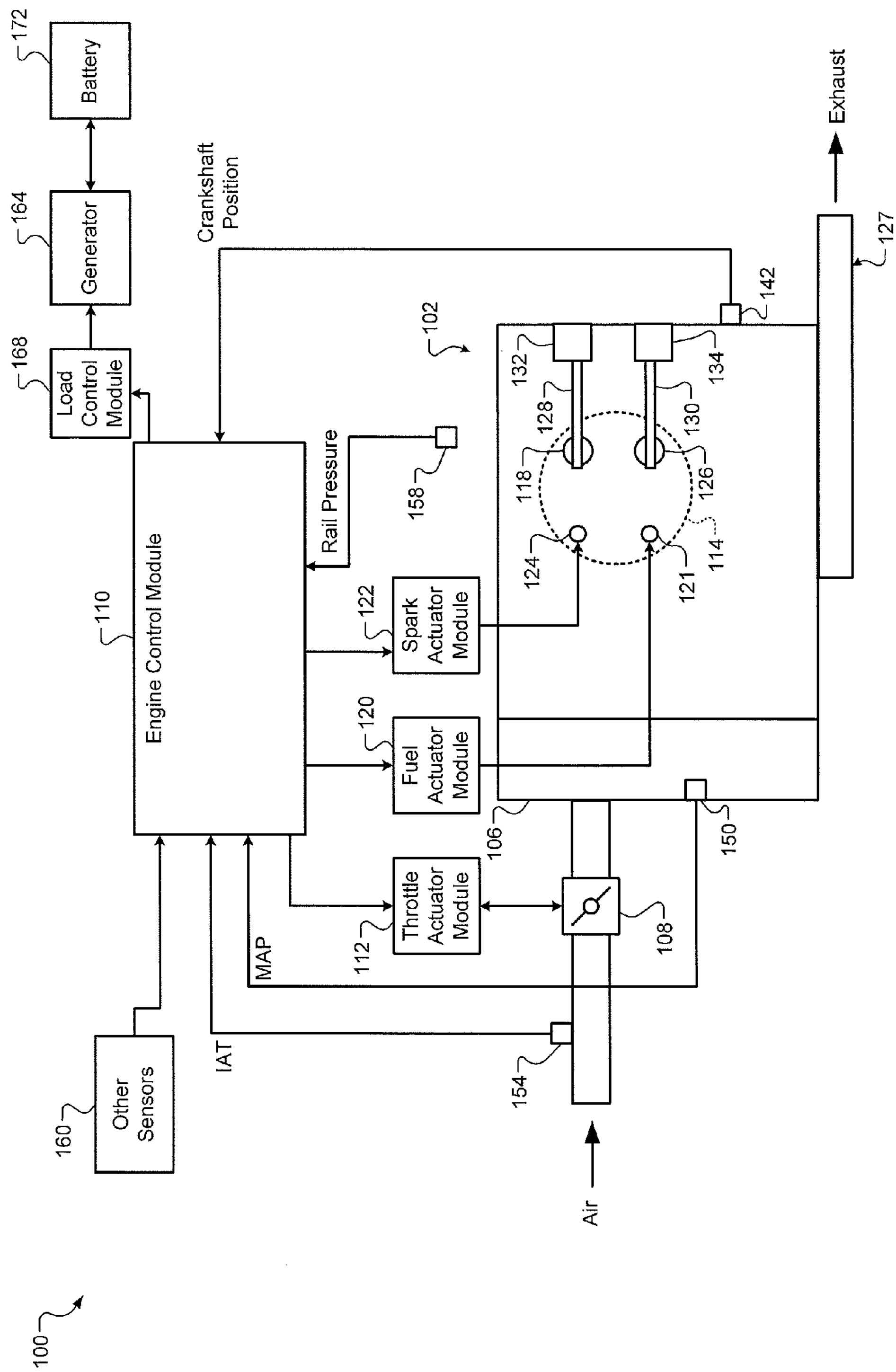
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A fuel injector is open and injects fuel from a fuel rail when a signal is in an active state. The fuel injector is closed when the signal is in an inactive state. A period that the signal is maintained in the active state for a combustion event of an engine may be referred to as a pulse width. An engine control module may estimate an amount of air trapped within a cylinder of the engine for the combustion event and set the pulse width based on the amount of air trapped within the cylinder. For example only, the control module may set the pulse width for the combustion event based on a stoichiometric air/fuel mixture.

Under some circumstances, however, a pulse width may be less than a predetermined period. When a pulse width is less than the predetermined period, the amount of fuel that is actually injected may vary from fuel injector to fuel injector and even for the same fuel injector. The variation may be attributable to, for example, part-to-part differences between fuel injectors and/or one or more other sources of variation.

According to the present disclosure, the engine control module generates N predicted pulse widths for N future combustion events of the engine. N is an integer greater than one. The engine control module determines a number of the N predicted pulse widths that are less than the predicted period. The engine control module generates a delta torque based on the number of the N predicted pulse widths that are less than the predetermined period. Based on the delta torque, the engine control module increases torque produced by the engine and increases a negative torque imposed on the engine by a generator.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another suitable type of engine.

Air is drawn into an intake manifold 106 through a throttle valve 108. The throttle valve 108 varies airflow into the intake manifold 106. For example only, the throttle valve 108 may include a butterfly valve having a rotatable blade. An engine control module (ECM) 110 controls a throttle actuator module 112 (e.g., an electronic throttle controller or ETC). The throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through one or more intake valves, such as intake valve 118.

The ECM 110 controls a fuel actuator module 120, and the fuel actuator module 120 controls opening of a fuel injector 121. The period that the fuel injector 121 is open for a combustion event may be referred to as a fuel pulse width. The fuel injector 121 may inject fuel into the cylinder 114. While not shown, a low pressure fuel pump draws fuel from a fuel tank and provides fuel to a high pressure fuel pump. For example only, the low pressure fuel pump may be an electric fuel pump. The high pressure fuel pump further pressurizes the fuel within a fuel rail. For example only, the high pressure fuel pump may be engine (e.g., crankshaft) driven. The fuel injector 121 is coupled to and injects fuel from the fuel rail.

Injected fuel mixes with air and creates an air/fuel mixture. The air/fuel mixture is combusted within the cylinder 114. A piston (not shown) within the cylinder 114 compresses the air/fuel mixture. Based upon a signal from the ECM 110, a spark actuator module 122 energizes a spark plug 124 in the cylinder 114. Spark generated by the spark plug 124 ignites the air/fuel mixture. The timing of the spark may be specified relative to the time when the piston is at its topmost position, referred to as top dead center (TDC).

The combustion of the air/fuel mixture drives the piston down, and the piston drives rotation of a crankshaft (not shown). After reaching a bottom most position, referred to as bottom dead center (BDC), the piston begins moving up again and expels the byproducts of combustion through one or more exhaust valves, such as exhaust valve 126. The byproducts of combustion are exhausted from the vehicle via an exhaust system 127.

Opening and closing of the intake valve 118 may be controlled by an intake camshaft 128. Opening and closing of the exhaust valve 126 may be controlled by an exhaust camshaft 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time when the intake valve 118 is opened for a combustion event may be varied with respect to the TDC position by an intake cam phaser 132. The time when the exhaust valve 126 is opened for a combustion event may be varied with respect to the TDC position by an exhaust cam phaser 134. In various implementations, lift of the intake valve 118 may be varied. Fuel injection timing may also be specified relative to the position of the piston.

The combustion events of the cylinders of the engine 102 occur in a predetermined order. The predetermined order may be referred to as a firing order. One engine cycle may refer to the period associated with each of the cylinders of the engine 102 undergoing one complete combustion cycle.

A crankshaft position sensor 142 monitors rotation of the crankshaft and generates a crankshaft position signal based on the rotation of the crankshaft. For example only, the crankshaft position sensor 142 may include a variable reluctance (VR) sensor or another suitable type of crankshaft position sensor.

The crankshaft position signal may include a pulse train. A pulse may be generated in the crankshaft position signal as a tooth of an N-toothed wheel (not shown) that rotates with the crankshaft passes the crankshaft position sensor 142. Accordingly, each pulse corresponds to an angular rotation of the crankshaft by an amount approximately equal to 360° divided by N teeth. The N-toothed wheel may also include a gap of one or more missing teeth, and the gap may be used as an indicator of one complete revolution of the crankshaft (i.e., 360 degrees of crankshaft rotation).

A pressure within the intake manifold 106, such as a manifold absolute pressure (MAP), may be measured by an intake pressure sensor 150. For ease of discussion only, the pressure within the intake manifold 106 will be discussed as being a MAP. Intake air temperature (IAT) may be measured by an IAT sensor 154. A pressure of fuel within the fuel rail (rail pressure) may be measured by a rail pressure sensor 158. One or more other sensors 160 may also be provided. For example only, the other sensors 160 may include a mass air flowrate (MAF) sensor, an accelerator pedal position sensor, a brake pedal position sensor, and/or one or more other suitable sensors.

A generator 164 selectively applies a negative torque on the crankshaft to generate electrical power. The negative torque is expressed relative to torque output by the engine 102 being positive torque. When applying a negative torque on the crankshaft, the generator 164 acts as a load on the engine 102. The negative torque of the generator 164 will be referred to as generator load.

For example only, the generator 164 may be an alternator (e.g., a regulated voltage control or RVC alternator) or a motor/generator unit. Motor/generator units (MGUS) can operate at a given time as either a motor to generate positive torque to supplement the torque output of the engine 102 (generator load=0 and motor torque>0) or a generator and act as a load on the engine 102 (generator load>0).

The generator 164 includes a stator and a rotor. A voltage is applied across the rotor via brushes and slip rings. The application of a voltage causes current to flow through the windings of the rotor, and the rotor acts as an electromagnet. As the rotor rotates, a magnetic field induces alternating current (AC) in stationary coils of the stator. A load control module 168 may control the voltage applied to the generator 164 to control the generator load. The generator 164 may include a converter that converts the AC power into direct current (DC) power that can be stored by one or more batteries, such as battery 172.

The ECM 110 controls the torque output of the engine 102 and the generator load. For example only, the ECM 110 may control the generator 164 to achieve a target value of the generator load. The ECM 110 may control the engine 102 to offset the generator load and to achieve a target value of torque output.

The ECM 110 generates air per cylinder (APC) values for a plurality of future combustion events. More specifically, the ECM 110 may generate N predicted APCs for N future combustion events of the engine 102, where N is an integer greater than one. The ECM 110 generates N predicted (fueling) pulse widths for the N future combustion events based on the N predicted APCs, respectively.

Under some circumstances, one or more of the N predicted pulse widths may be less than a predetermined period. When a pulse width is less than the predetermined period, the amount (e.g., mass) of fuel that is injected by a fuel injector when the pulse width is applied may vary from fuel injector to fuel injector. The variation (e.g., percent) may be more than a predetermined allowable amount when the pulse width is less than the predetermined period. The variation may be attributable to, for example, part-to-part differences and/or one or more other sources.

The ECM 110 may determine a number of the N predicted pulse widths that are less than the predetermined period. The ECM 110 selectively increases or decreases the target value of the engine torque output based on the amount of the N predicted pulse widths that are less than the predetermined period. For example only, the ECM 110 selectively increases the target value when the amount is greater than the a predetermined amount and vice versa.

Based on the increase in the target value of engine torque output, the ECM 110 may selectively increase one or more airflow parameters. An increase in the one or more airflow parameters may cause the ECM 110 to also increase one or more of the N predicted pulse widths. In this manner, the ECM 110 may increase one or more of the N predicted pulse widths to greater than the predetermined period. However, the engine torque output would also increase. The ECM 110 offsets the increase in the engine torque output by correspondingly increasing the generator load.

Figure 2:
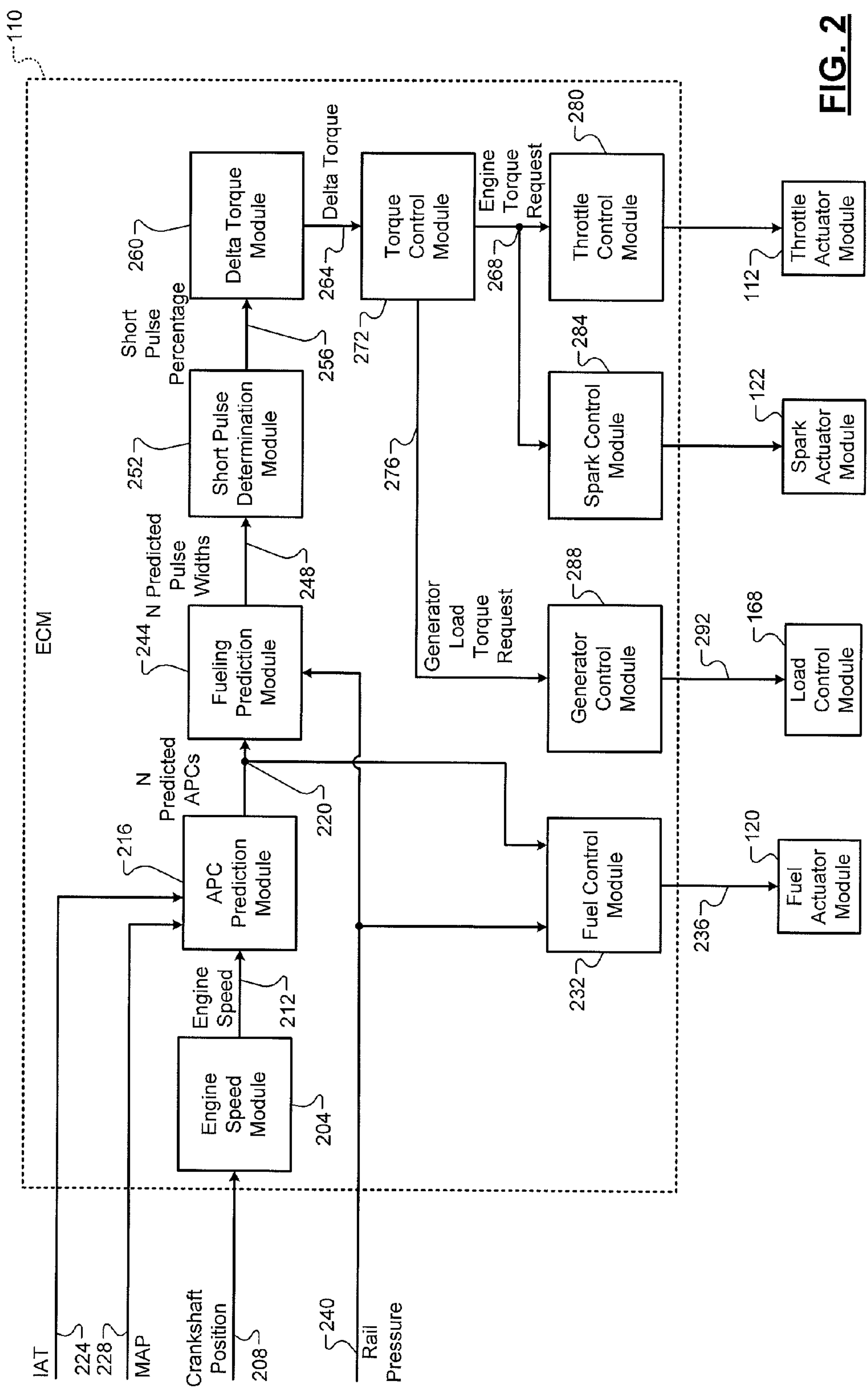
FIG. 2 is a functional block diagram of an example fuel and generator control system according to the present disclosure.

Referring now to FIG. 2, a functional block diagram of an example implementation of the ECM 110 is presented. An engine speed module 204 determines a rotational speed of the crankshaft based on a crankshaft position 208. For example only, the crankshaft position 208 may be based on the crankshaft position signal generated by the crankshaft position sensor 142. The rotational speed of the crankshaft generated by the engine speed module 204 will be referred to as engine speed 212.

An APC prediction module 216 generates the N predicted APCs 220 for the next N combustion events of the engine 102, respectively, based on the engine speed 212. Each of the N predicted APC 220 may correspond to an amount (e.g., mass) of air expected to be combusted during one of next N combustion events. The APC prediction module 216 may generate the N predicted APC 220 further based on an IAT 224 and a MAP 228. For example only, the IAT 224 may be measured using the IAT sensor 154, and the MAP 228 may be measured using the intake pressure sensor 150.

N is an integer greater than one. N may be equal to M*Q, where M is the (total) number of cylinders of the engine 102 and M is an integer greater than zero. Q is may be an integer greater than zero and Q may correspond to a predetermined number of engine cycles. Q may be equal to, for example, 1, 2, 3, or another suitable value. For example only, for a 4-cylinder engine (i.e., M=4) and generating predicted APC values for each combustion event of the next 3 engine cycles (i.e., Q=3) after a present combustion event, N is equal to 12. In such an example, the APC prediction module 216 generates 12 predicted APCs 220, one of the 12 predicted APCs 220 for each of the next 12 combustion events of the engine 102.

A fuel control module 232 may control fuel injection based on one or more of the N predicted APCs 220. For example only, the fuel control module 232 may set P commanded pulse widths 236 for the next P combustion events, where P is an integer greater than zero and less than N. The fuel control module 232 may set the P commanded pulse widths 236 based on the P ones of the N predicted APCs 220 for the next P combustion events, respectively.

The fuel control module 232 may set the P commanded pulse widths 236 further based on a rail pressure 240. For example only, the rail pressure 240 may be the rail pressure measured by the rail pressure sensor 158. The fuel actuator module 120 selectively opens fuel injectors of the engine 102 based on the P commanded pulse widths 236 for the P combustion events, respectively. For example only, the fuel control module 232 may set the P commanded pulse widths 236 to achieve a stoichiometric air/fuel mixture for the combustion events.

A fueling prediction module 244 generates N predicted pulse widths 248 for the N future combustion events based on the N predicted APCs 220, respectively. For example only, the fueling prediction module 244 may generate the N predicted pulse widths 248 to achieve the stoichiometric air/fuel mixture for each of the next N combustion events. Each of the N predicted pulse widths 248 corresponds to a predicted period that a fuel injector of the engine 102 will be open for one of the next N combustion events.

A short pulse determination module 252 receives the N predicted pulse widths 248. The short pulse determination module 252 determines a number of the N predicted pulse widths 248 that are less than the predetermined period. For example only, the predetermined period may be approximately 0.7 milliseconds (ms) or another suitable value.

The short pulse determination module 252 may generate a short pulse percentage 256 based on the number of the N predicted pulse widths 248 that are less than the predetermined period. For example only, the short pulse determination module 252 may set the short pulse percentage 256 equal to the number of the N predicted pulse widths 248 that are less than the predetermined period divided by N and multiplied by 100. While the present disclosure will be discussed in terms of a percentage, the number or another suitable indicator of the number of the N predicted pulse widths 248 that are less than the predetermined period may be used.

A delta torque module 260 generates a delta torque 264 (e.g., in Newton-meters or Nm) based on the short pulse percentage 256. The delta torque module 260 selectively increments and decrements an integrator value (e.g., a counter value) based on the short pulse percentage 256. For example only, the delta torque module 260 increases the integrator value at an incrementing rate when the short pulse percentage 256 is greater than a predetermined percentage. The delta torque module 260 may also limit the integrator value to a maximum value when the short pulse percentage 256 is greater than the predetermined percentage. For example only, the predetermined percentage may be approximately 30 percent (%) or another suitable value that is greater than zero.

The incrementing rate and the maximum value (of the integrator value) may be variable values. The incrementing rate corresponds to an increase in the integrator value per unit time (e.g., per control loop). The maximum value corresponds to a maximum allowable value of the integrator value when the short pulse percentage 256 is greater than the predetermined percentage.

The delta torque module 260 may determine the incrementing rate based on a response period between when an increase in an engine torque request 268 is made and when an associated increase in the engine torque output occurs. The delta torque module 260 may determine the incrementing rate based on a volume of the intake manifold 106, the engine speed 212, and one or more other suitable parameters. For example only, the delta torque module 260 may, for example, increase incrementing rate as the engine speed 212 increases and/or as the volume of the intake manifold 106 decreases and vice versa. The delta torque module 260 may determine the incrementing rate, for example, using one or more functions and/or mappings that relate the volume of the intake manifold 106 and the engine speed 212 to the incrementing rate.

The delta torque module 260 may determine the maximum value based on a state of charge (SOC) of the battery 172, a torque load capacity of the generator 164, and one or more other suitable parameters. The SOC of the battery 172 may refer to a present level of charge of the battery 172 relative to a maximum charge level. The torque load capacity of the generator 164 may refer to a present value of the generator load relative to a maximum generator load. For example only, the delta torque module 260 may decrease the maximum value as the present level of charge approaches the maximum charge level and/or as the present generator load approaches the maximum generator load and vice versa. The delta torque module 260 may determine the maximum level, for example, using one or more functions and/or mappings that relate the SOC of the battery 172 and the torque load capacity of the generator 164 to the maximum value.

When the short pulse percentage 256 is less than the predetermined percentage but not equal to zero (i.e., one or more of the N predicted pulse widths is greater than the predetermined period), the delta torque module 260 may maintain the integrator value. The delta torque module 260 selectively decreases the integrator value at a decrementing rate when the short pulse percentage 256 is (less than the predetermined percentage and) equal to zero. The delta torque module 260 may limit the integrator value to a minimum value when the short pulse percentage 256 is equal to zero. For example only, the minimum value may be zero or another suitable value.

The decrementing rate may be a variable value. The decrementing rate corresponds to a decrease in the integrator value per unit time (e.g., per control loop) when the short pulse percentage 256 is less than the predetermined percentage.

The delta torque module 260 may determine the decrementing rate based on a response period between when a decrease in an engine torque request 268 is made and when an associated decrease in the engine torque output occurs. The delta torque module 260 may determine the decrementing rate based on the volume of the intake manifold 106, the engine speed 212, and one or more other suitable parameters. The decrementing rate may be different than the incrementing rate. For example only, the decrementing rate may be different than the incrementing rate due to a difference between how fast the throttle valve 108 can be opened and how fast the throttle valve 108 can be closed. The delta torque module 260 may determine the decrementing rate, for example, using one or more functions and/or mappings that relate the volume of the intake manifold 106 and the engine speed 212 to the incrementing rate.

The delta torque module 260 sets the delta torque 264 based on the integrator value and a scalar value. The scalar value may be a predetermined value for converting the integrator value into a torque (e.g., Nm). The scalar value may be set, for example, such that the delta torque 264 will always be less than a difference between the maximum generator load and the present value of the generator load when the integrator value is equal to the maximum value. For example only, the delta torque module 260 may set the delta torque 264 equal to the integrator value multiplied by the scalar value.

A torque control module 272 generates the engine torque request 268 and a generator load torque request 276 based on the delta torque 264. For example only, a driver torque request (not shown) may be determined based on an accelerator pedal position, a brake pedal position, a vehicle speed, and/or one or more other suitable parameters. The torque control module 272 may determine the engine torque request 268 based on the sum of the driver torque request and the delta torque 264. A base generator load torque may be determined, for example, based on the SOC of the battery 172 and/or one or more other suitable parameters. The torque control module 272 may determine the generator load torque request 276 based on the sum of the base generator load torque and the delta torque 264.

Various actuator control modules control engine actuators to achieve the engine torque request 268. For example only, a throttle control module 280 and a spark control module 284 control the throttle actuator module 112 and the spark actuator module 122 based on the engine torque request 268. One or more other actuator control modules may control other engine actuators based on the engine torque request 268, such as a camshaft phaser control module, a variable valve lift control module, a boost control module, and/or one or more other actuator control modules.

The increase in the engine torque request 268 attributable to the delta torque 264 causes the throttle control module 280 to increase the opening of the throttle valve 108. The increase in the opening of the throttle valve 108 may prompt the APC prediction module 216 to increase one or more of the N predicted APCs 220. The increase in one or more of the N predicted APCs 220 may prompt the fuel control module 232 and the fueling prediction module 244 to increase one or more of the P commanded pulse widths 236 and one or more of the N predicted pulse widths 248, respectively. In this manner, one or more of the N predicted pulse widths 248 that are less than the predetermined period may be adjusted to be greater than the predetermined period.

A generator control module 288 controls the generator load based on the generator load torque request 276. For example only, the generator control module 288 may generate a desired current 292 corresponding to the generator load torque request 276. The load control module 168 may control the current applied to the generator 164 based on the desired current 292 to achieve the generator load torque request 276.

In contrast with an increase in engine torque output associated with the increase in the engine torque request 268, an increase in the generator load torque request 276 causes a decrease in the torque output to the transmission because the generator load is a negative torque. The reverse is also true. An increase in the generator load attributable to the delta torque 264 therefore offsets an increase in engine torque output associated with the increase in the engine torque request 268 and vice versa.

Figure 3:
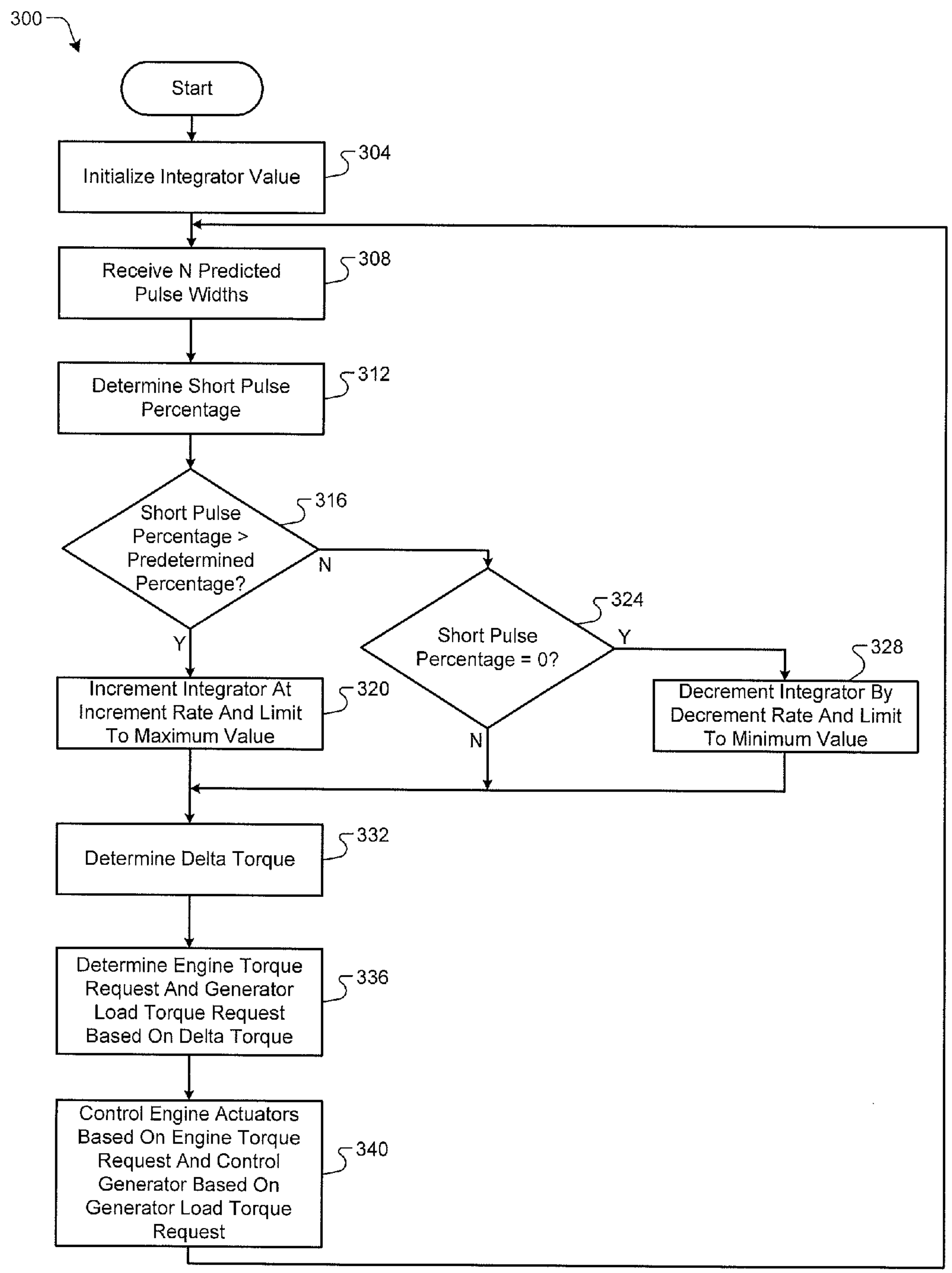
FIG. 3 is a flowchart depicting an example method of controlling engine actuators and a generator according to the present disclosure.

Referring now to FIG. 3, a flowchart depicting an example method 300 of controlling the engine actuators and the generator load is presented. Control may begin with 304 where control sets the integrator value to zero. At 308, control receives the N predicted pulse widths 248.

At 312, control determines the number of the N predicted pulse widths 248 that are less than the predetermined period and determines the short pulse percentage 256 based on the number and N. For example only, control may set the short pulse percentage 256 equal to the number divided by N and multiplied by 100. Control determines whether the short pulse percentage 256 is greater than the predetermined percentage at 316. If true, control may increment the integrator value by an incrementing amount corresponding to the incrementing rate for one control loop at 320, and control may continue with 332 (discussed further below). If false, control may transfer to 324. Control may also limit the integrator value to the maximum value at 320.

Control determines whether the short pulse percentage 256 is equal to zero at 324. If true, control decrements the integrator value by a decrementing amount corresponding to the decrementing rate at 328 and continues with 332. If false, control may continue with 332. Control may also limit the integrator value to the minimum value at 328.

At 332, control determines the delta torque 264 based on the integrator value. For example only, control may set the delta torque 264 equal to the integrator value multiplied by the scalar value. Control determines the engine torque request 268 and the generator load torque request 276 based on the delta torque 264 at 336. For example only, control may determine the engine torque request 268 and the generator load torque request 276 by adding the delta torque 264 to the driver torque request and to the base generator load torque, respectively.

The engine actuators are controlled based on the engine torque request 268 and the generator 164 is controlled based on the generator load torque request 276 at 340. For example only, the engine actuators may be controlled to achieve the engine torque request 268 and the generator load may be controlled to achieve the generator load torque request 276. Control may return to 308.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system of a vehicle, comprising:

a fueling prediction module that generates N predicted fueling pulse widths for N future combustion events of an engine, respectively, wherein N is an integer greater than one;

a short pulse determination module that determines a number of the N predicted fueling pulse widths that are less than a predetermined period;

a torque control module that selectively increases a torque output of the engine based on the number; and a generator control module that selectively increases a load imposed by a generator of electricity based on the number.

2. The system of claim 1 further comprising:

a delta torque module that determines a delta torque based on the number, wherein the torque control module adjusts an engine torque request and a generator load torque request by the delta torque; and a throttle control module that controls opening of a throttle valve based on the engine torque request, wherein the generator control module controls the load based on the generator load torque request.

3. The system of claim 2 wherein the delta torque module increases an integrator value when the number is greater than a predetermined number that is an integer greater than zero, decreases the integrator value when the number is equal to zero, and determines the delta torque based on the integrator value and a scalar value.

4. The system of claim 3 wherein the delta torque module sets the delta torque equal to a product of the integrator value and the scalar value.

5. The system of claim 3 wherein the delta torque module increases the integrator value at an incrementing rate when the number is greater than the predetermined number and determines the incrementing rate based on at least one of an engine speed and an intake manifold volume.

6. The system of claim 3 wherein the delta torque module decreases the integrator value at a decrementing rate when the number is equal to zero and determines the decrementing rate based on at least one of an engine speed and an intake manifold volume.

7. The system of claim 3 wherein the delta torque module limits the integrator value to between a maximum value and a minimum value, inclusive.

8. The system of claim 7 wherein the delta torque module determines the maximum value based on at least one of a state of charge of a battery and the load.

9. The system of claim 3 wherein the delta torque module maintains the integrator value when the number is less than the predetermined number and greater than zero.

10. The system of claim 2 wherein the delta torque module increases the delta torque when the number is greater than a predetermined number, and wherein the torque control module increases the engine torque request and the generator load torque request based on the increase in the delta torque.

11. A method for a vehicle, comprising:

generating N predicted fueling pulse widths for N future combustion events of an engine, respectively, wherein N is an integer greater than one;

determining a number of the N predicted fueling pulse widths that are less than a predetermined period;

selectively increasing a torque output of the engine based on the number; and selectively increasing a load imposed by a generator of electricity based on the number.

12. The method of claim 11 further comprising:

determining a delta torque based on the number;

adjusting an engine torque request and a generator load torque request by the delta torque;

controlling opening of a throttle valve based on the engine torque request; and controlling the load based on the generator load torque request.

13. The method of claim 12 further comprising:

increasing an integrator value when the number is greater than a predetermined number that is an integer greater than zero;

decreasing the integrator value when the number is equal to zero; and determining the delta torque based on the integrator value and a scalar value.

14. The method of claim 13 further comprising setting the delta torque equal to a product of the integrator value and the scalar value.

15. The method of claim 13 further comprising:

increasing the integrator value at an incrementing rate when the number is greater than the predetermined number; and determining the incrementing rate based on at least one of an engine speed and an intake manifold volume.

16. The method of claim 13 further comprising:

decreasing the integrator value at a decrementing rate when the number is equal to zero; and determining the decrementing rate based on at least one of an engine speed and an intake manifold volume.

17. The method of claim 13 further comprising limiting the integrator value to between a maximum value and a minimum value, inclusive.

18. The method of claim 17 further comprising determining the maximum value based on at least one of a state of charge of a battery and the load.

19. The method of claim 13 further comprising maintaining the integrator value when the number is less than the predetermined number and greater than zero.

20. The method of claim 12 further comprising:

increasing the delta torque when the number is greater than a predetermined number; and increasing the engine torque request and the generator load torque request based on the increase in the delta torque.

* * * * *

UNITED STATES PATENT AND TRADEMARK OFFICE

CERTIFICATE OF CORRECTION

PATENT NO. : 9,140,206 B2
APPLICATION NO. : 13/149221
DATED : September 22, 2015
INVENTOR(S) : Mike M. Mc Donald It is certified that error appears in the above-identified patent and that said Letters Patent is hereby corrected as shown below:

Title Page, Item [73] Assignee, insert the following:
--GM Global Technology Operations LLC, Detroit, MI (US)--

Signed and Sealed this
Twenty-ninth Day of March, 2016

Michelle K. Lee
*Director of the United States Patent and Trademark Office*